US009356331B2

(12) United States Patent
Toonen

(10) Patent No.: US 9,356,331 B2
(45) Date of Patent: May 31, 2016

(54) OPTICALLY TRANSPARENT, RADIO FREQUENCY, PLANAR TRANSMISSION LINES

(71) Applicant: U.S. Army Research Laboratory, Adelphi, MD (US)

(72) Inventor: Ryan C. Toonen, Belcamp, MD (US)

(73) Assignee: The United States of America as represented by the Secretary of the Army, Washington, DC (US)

( * ) Notice: Subject to any disclaimer, the term of this patent is extended or adjusted under 35 U.S.C. 154(b) by 0 days.

(21) Appl. No.: 14/247,380

(22) Filed: Apr. 8, 2014

(65) Prior Publication Data

US 2015/0042420 A1 Feb. 12, 2015

Related U.S. Application Data

(60) Provisional application No. 61/862,656, filed on Aug. 6, 2013.

(51) Int. Cl.
*H01P 3/08* (2006.01)
*H01Q 1/38* (2006.01)
*B82Y 30/00* (2011.01)

(52) U.S. Cl.
CPC *H01P 3/081* (2013.01); *B82Y 30/00* (2013.01)

(58) Field of Classification Search
CPC ....... H01P 3/081; H01P 3/082; H05K 1/0225; H01Q 1/246; H01Q 9/0457; H01Q 21/08
USPC ............. 333/238, 246; 343/700 MS, 846
See application file for complete search history.

(56) References Cited

U.S. PATENT DOCUMENTS

| | | | | |
|---|---|---|---|---|
| 4,296,478 A * | 10/1981 | Kiess et al. | .................. | 365/112 |
| 5,489,489 A | 2/1996 | Swirbel et al. | | |
| 5,767,808 A * | 6/1998 | Robbins et al. | ........ | 343/700 MS |
| 5,872,542 A * | 2/1999 | Simons et al. | ......... | 343/700 MS |
| 6,150,974 A * | 11/2000 | Tasaka et al. | .................. | 342/53 |
| 6,175,332 B1 * | 1/2001 | Fedors | .................. | 343/700 MS |
| 6,388,621 B1 * | 5/2002 | Lynch | .................. | 343/700 MS |
| 6,407,441 B1 * | 6/2002 | Yuan | ............................. | 257/531 |
| 7,173,232 B2 * | 2/2007 | Yagi et al. | .................. | 250/214.1 |
| 7,192,648 B2 * | 3/2007 | Hartig et al. | .................. | 428/432 |
| 7,566,889 B1 * | 7/2009 | Klein et al. | .................. | 250/503.1 |
| 7,696,835 B2 * | 4/2010 | Sawai et al. | ..................... | 333/20 |
| 7,830,592 B1 * | 11/2010 | Sprague et al. | ............... | 359/296 |
| 8,018,410 B2 | 9/2011 | Schmitz et al. | | |
| 8,079,722 B2 * | 12/2011 | Thiele | .......................... | 359/883 |
| 8,232,920 B2 * | 7/2012 | Ding et al. | ............. | 343/700 MS |
| 8,405,629 B2 * | 3/2013 | Reinfried et al. | ............. | 345/173 |

(Continued)

OTHER PUBLICATIONS

Lee et al, "Solution-Processed Metal Nanowire Mesh Transparent Electrodes", Nano Letters, vol. 8, No. 2 (Jan. 2008).*

(Continued)

*Primary Examiner* — Kenneth B Wells
(74) *Attorney, Agent, or Firm* — Christos S. Kyriakou

(57) ABSTRACT

A high radio frequency transmission line having a dielectric substrate with two sides and constructed of a transparent material. An electrically conductive strip extends along at least a portion of one side of the substrate. An electrically conductive film is deposited on one of the sides of the substrate at a position spaced from the conductive strip. This conductive film has a thickness sufficiently small so that the film is substantially transparent.

25 Claims, 1 Drawing Sheet

(56) References Cited

U.S. PATENT DOCUMENTS

| | | | |
|---|---|---|---|
| 8,872,711 B2* | 10/2014 | Parsche | 343/720 |
| 8,900,659 B2* | 12/2014 | Zeng et al. | 427/217 |
| 8,937,575 B2* | 1/2015 | Ward et al. | 343/700 MS |
| 2012/0154241 A1 | 6/2012 | Tatamikov et al. | |

OTHER PUBLICATIONS

Ginley, D. S.; Hosono, H.; Paine, D. C. Handbook of Transparent Conductors (Springer Science+Business Media, New York, NY, 2010.

Seshadri ,V.; Sotzing, G. A. Progress in Optically Transparent Conducting Polymers in Organic Photovoltaics. Mechanisms, Materials, and Devices; N. S. Sariciftci and S. S. Sun Ed., CRC Press, New York, NY, 2005.

Wassei, J. K.; Kaner, R. B. Graphene, a Promising Transparent Conductor. Mater. Today 2010, 13, 52-59.

O'Connor, B.; Haughn, C.;An, K. H.; Pipe, K. P.; Shtein, M. Transparent and Conductive Electrodes Based on Unpatterned, Thin Metal Films. Appl. Phys. Lett. 2008, 93, 223304.

Hu, L. B.; Wu, H.; Cui, Y. Metal Nanogrids, Nanowires, and Nanofibers for Transparent Electrodes. MRS Bull 2011, 36, 760-765.

Guan, N.; Furuya, H.; Delaume, D.; Ito, K. Antennas Made of Transparent Conductive Films. PIERS Online 2008, 4, 116-120.

Xu, H.; Anlage, S. M.; Hu, L.; Gruner, G. Microwave Shielding of Transparent and Conducting Single-Walled Carbon Nanotube Films. Appl. Phys. Lett. 2007, 90, 183119.

Son, K.-A. Nanostructure-Based Transparent Conductive Coating for RFI Shielding. Poster presented at the NanoTechnology for Defense Conference, Sumerlin, NV, Aug. 6-9, 2012.

Adams, E. P. The Hall and Corbino Effects. Proc. Am. Phil. Soc. 1915, 54, 47-51.

Wu, Z. C.; Chen, Z. H.; Du, X.; Logan, J. M.; Sippel, J.; Nikolou, M.; Kamaras, K.; Reynolds, J. R.; Tanner, D. B.; Hebard, A. F.; Rinzler, A. G. Transparent, Conductive Carbon Nanotube Films. Science 305 2004, 1273-1276.

MicroChem Corp., "LOR and PMGI Resists," datasheet, Rev. A. Available: http://microchem.com/Prod-PMGI_LOR.htm (accessed Nov. 13, 2012).

Collin, R. E. Foundations for Microwave Engineering; 2nd Ed., Wiley and Sons: Hoboken, NJ, 2001; pp. 115-117.

Cheng, D. K. Field and Wave Electromagnetics; 2nd Ed., Addison-Wesley, Reading, PA, 1992; pp. 440, 451, 466.

Kittel, C. Introduction to Solid State Physics, 7th Ed., Wiley and Sons: Hoboken, NJ, 1996 pp. 273-274.

Low Level Measurements Handbook, 6th Ed., Keithley Instruments, Inc., Cleveland, OH, 2004; pp. 2-42, 3-18, 4-51.

van der Pauw, L. J. A method of Measuring Specific Resistivity and Hall Effect of Discs of Arbitrary Shape. Philips Res. Repts. 1958, 13, 11.

Skin Depth—Microwave Encyclopedia—Microwaves101.com, Nov. 2010. [Online]. Available: http://www.microwaves101.com/encyclopedia/skindepth.cfm (accessed Nov. 14, 2012).

Gordon, R. Criteria for Choosing Transparent Conductors. MRS Bull. 2000, 25, 52-57.

Electrical resistivity and conductivity—Wikipedia, the Free Encyclopedia, Nov. 2012 [Online]. Available: http://en.wikipedia.org/wiki/Electrical_resistivity_and_conductivity#cite_note-serway-8 (accessed Nov. 14, 2012).

Collins, P. G.; and Avouris, P. H. Nanotubes for Electronics. Sci. Am. 2000, 283, 38.

Komatsu, N.; Wang, F. A. Comprehensive Review on Separation Methods and Techniques for Single-Walled Carbon Nanotubes. Materials 2010, 3, 3818-3844.

Duclaux, L. Review of the Doping of Carbon Nanotubes (Multiwalled and Single-Walled. Carbon 2002, 40, 1751.

Toonen, Ryan c. et al. "Evaluation of Carbon Nanotube Thin Films for Optically Transparent Microwave Applications Using On-Wafer Probing of Corbino Disc Test Structures" Army Research Laboratory Technical Report ARL-TR-6362 Mar. 2013.

* cited by examiner

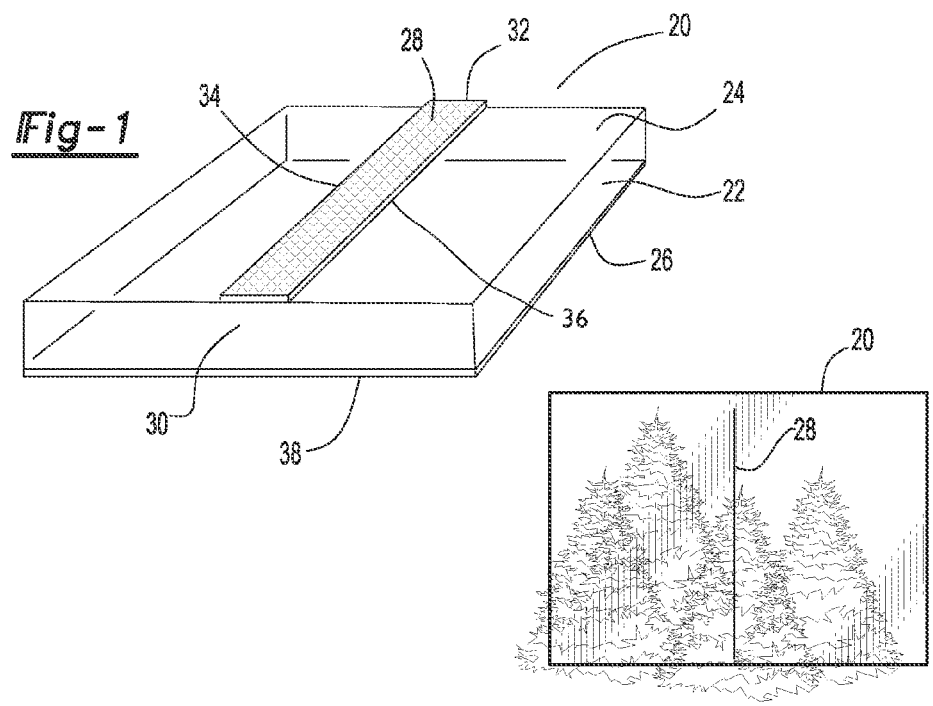
Fig-1
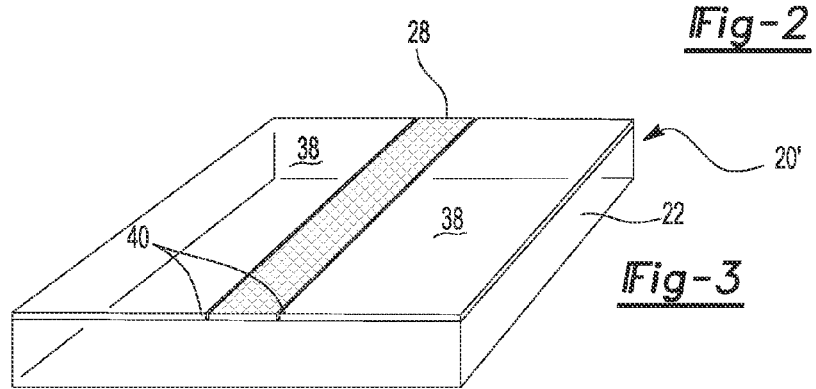
Fig-2
Fig-3
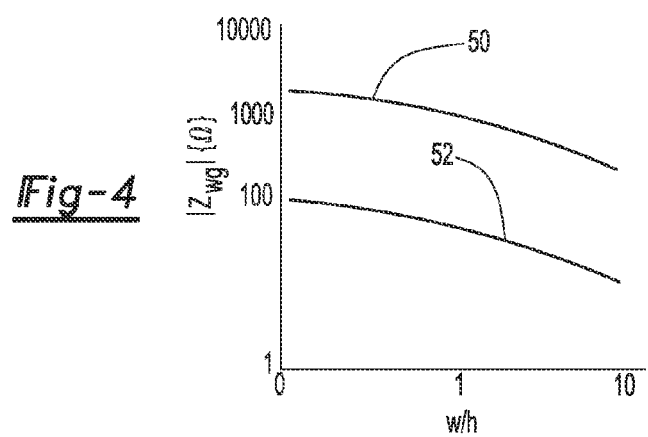
Fig-4

OPTICALLY TRANSPARENT, RADIO FREQUENCY, PLANAR TRANSMISSION LINES

CROSS-REFERENCE TO RELATED APPLICATIONS

This patent application claims the benefit of provisional application U.S. 61/862,656 filed on Aug. 6, 2013 (ARL 13-34P) and titled "Sub-Skin-Depth Microfabricated Transmission Lines for Inconspicuous Communication Circuitry" listing Dr. Ryan Christopher Toonen as inventor.

GOVERNMENT INTEREST

The invention described herein may be manufactured, used, and licensed by or for the United States Government.

BACKGROUND OF THE INVENTION

I. Field of the Invention

The present invention relates to high radio frequency transmission lines.

II. Description of Relevant Art

It is well known that single electrical conductors, such as wires, are inadequate for conducting high frequency signals, i.e. radio signals in the microwave or millimeter wave range. Such high frequency signals, hereinafter collectively referred to as microwaves, are used for many different types of applications, such as radar and line of sight radio communication.

One previously known method of conveying microwave radio communications is to create a microwave transmission line. These previously known microwave transmission lines typically comprise a planar dielectric substrate having spaced apart upper and lower sides. The spacing between the upper and lower sides, i.e. the thickness, of the dielectric substrate will vary depending upon the operational radio frequency of the transmission line and the dielectric constant of the substrate.

In order to convey the microwave signal between two points on the substrate, a highly electrically conductive microstrip extends between the two points on the substrate. The microstrip is typically constructed of a metal, such as gold, silver, or copper, and extends between the two points on the substrate. The thickness of the microstrip typically is greater than five skin depths corresponding to the operating frequency of the transmission line and in which one skin depth is the distance penetrating into a signal conductor at which the alternating current density has exponentially decayed to 1/e of the value at the surface of the signal conductor that faces ground. As such, the microstrip is optically opaque. However, the width of the microstrip as it extends between the two points on the dielectric substrate is typically very narrow.

In order to complete the transmission line, a conductive ground plane is formed on the opposite side of the dielectric substrate. This conductive ground plane may also be constructed of a highly electrically conductive material, such as gold, silver, or copper, and, for greatest efficiency, preferably has a skin depth of greater than five skin depths corresponding to the operating frequency of the transmission line.

While these previously known microstrip transmission lines have proven effective in conveying microwave signals between different points in the microwave circuit, the previously known practice of forming the ground plane from a relatively thick conductive material, i.e. greater than five skin depths, is that the resulting structure is necessarily opaque to visible light. As such, the overall microstrip transmission line cannot be used for applications where transparency to visible light would be desirable. Such situations would include, for example, covert microwave antennas and other communication components.

SUMMARY OF THE PRESENT INVENTION

The present invention provides a microwave transmission line that is substantially transparent to visible light. As such, the transmission line of the present invention may be utilized in applications, such as covert or windshield antennas, where transparency to visible light is required.

In brief, the microwave transmission line of the present invention comprises a dielectric substrate having two spaced apart, planar and parallel upper and lower sides. The substrate itself is constructed of a material that is transparent to visible light. Such materials include, for example, sapphire, quartz, amorphous silicon dioxide (glass), as well as other materials.

In order to convey the microwave signal between two points on the substrate, a conventional microstrip extends along the top of the substrate between the two points. This microstrip is conventional in construction and thus comprises a highly conductive material, such as gold, silver, or copper, and has an overall width greater than one skin depth at the operating frequency of the transmission line. Preferably, the microstrip has a thickness greater than five skin depths at the operating frequency of the transmission line and is thus opaque to visible light. The actual width of the microstrip, however, is very small, typically a millimeter or less, and thus optically insignificant.

An electrically conductive film is then deposited on the upper or lower side of the substrate so that the electrically conductive film is spaced from the conductive strip. The electrically conductive film may be deposited on the side of the dielectric substrate opposite from the conductive strip, or on the same side of the dielectric substrate as the conductive strip, but spaced from the conductive strip.

Unlike the previously known microwave transmission lines, however, the electrically conductive film has a thickness sufficiently small so that the film is substantially transparent to visible light. The conductive film has a thickness less than one skin depth at the operating frequency of the transmission line, and preferably, approximately one fifth of the skin depth of the transmission line at its operating frequency.

Many different materials may be utilized to form the conductive film. However, in the preferred embodiment of the invention, nano-structured materials, such as exfoliated graphene, networks of carbon nanotubes, elemental metal ultrathin films, nano-wire grids, transparent conducting oxide thin films, transparent conducting polymer thin films, or an encapsulated transparent conducting fluid, are used for the conductive film. Ultrathin films are films having a thickness of not greater than 100 nanometers.

The conductive film may be disposed on the side of the substrate opposite from the conductive strip. Alternatively, however, the conductive film may be deposited on the same side of the dielectric substrate as the conductive strip. In this case, however, the conductive film is spaced from the conductive strip so that a continuous gap is formed between the conductive strip and the conductive film.

Because the conductive film is deposited on the substrate at a thickness of below the skin depth corresponding to the operating frequency of the transmission line, the overall efficiency of the transmission line of the present invention is necessarily less than the previously known microwave transmission lines in which the ground plane was several skin depths in thickness. However, unlike the previously known microwave transmission lines, the conductive film is transparent, or substantially transparent, to visible light. Since the dielectric substrate is also transparent to visible light, the entire transmission line structure is essentially transparent to visible light, except for the conductive strip. However, since the width of the conductive strip is very small, typically less than a millimeter, the opacity of the conductive strip provides only minimal interference with the overall transparency of the transmission line structure.

Since the transmission line of the present invention is substantially transparent to visible light, it may be effectively used in applications, such as covert microwave antennas, as well as other microwave circuits.

BRIEF DESCRIPTION OF THE DRAWING

A better understanding of the present invention will be had upon reference to the following detailed description when read in conjunction with the accompanying drawing, wherein like reference characters refer to like parts throughout the several views, and in which:

FIG. 1 is an elevational view illustrating a first preferred embodiment of the present invention;

FIG. 2 is a plan view illustrating the transparency of the transmission line of the present invention;

FIG. 3 is a view similar to FIG. 1, but illustrating a second preferred embodiment of the invention; and FIG. 4 is a graph illustrating the impedance characteristics of the transmission line of the present invention as contrasted to previously known transmission lines.

DETAILED DESCRIPTION OF PREFERRED EMBODIMENTS OF THE PRESENT INVENTION

With reference first to FIG. 1, an exemplary transmission line 20 in accordance with the present invention is shown. This transmission line is used to convey microwave signals between two points.

The transmission line 20 includes a dielectric substrate 22 that is generally planar having an upper side 24 and a lower side 26. The sides 24 and 26, preferably are spaced apart and parallel to each other.

The dielectric substrate 22 is transparent, or at least substantially transparent, to visible light and may be constructed of any conventional material. These materials include, but are not limited to, sapphire; quartz; amorphous silicon dioxide or glass; transparent plastics such as Mylar, Kapton, and Plexiglas; as well as other materials. The actual thickness of the dielectric substrate 22, i.e. the distance between its top side 24 and bottom side 26, will vary as a function of the dielectric constant of the substrate 22 as well as the expected operational frequency of the transmission line 20.

An elongated electrically conductive strip 28, also known as a microstrip, extends along one side 24 of the substrate 22 from a first point 30 to a second point 32. The conductive strip 28 may be constructed of any conventional conductive material, but preferably a highly electrically conductive metal such as gold, silver, copper, and alloys thereof are used for the conductive strip 28. Furthermore, any conventional means may be used to attach the conductive strip 28 to the substrate 22.

The width of the conductive strip 28, i.e. the distance between its sides 34 and 36, will vary as a function of several factors including, for example, the characteristic impedance requirements of the transmission line 20. However, the overall width of the conductive strip 28 may be relatively small, for example less than 1 millimeter, for most microwave applications.

Still referring to FIG. 1, a thin electrically conductive film 38 is deposited over the second side 26 of the dielectric substrate 22. This conductive film 38 has a thickness of less than one skin depth at the operating frequency of the transmission line 20. Preferably, the thickness of the conductive film 38 is less than one half of a skin depth and as low as one fifth of a skin depth at the operating frequency of the transmission line 20.

The conductive film 38 forms the ground plane for the transmission line 20 and may be composed of a wide variety of materials. However, preferably the conductive film 38 comprises a nano-structured material such as exfoliated graphene, elemental metal ultrathin films, nano-wire grids, carbon nano-tube networks, transparent conducting oxides, conducting polymers, and so forth.

For maximum efficiency, i.e. minimal signal loss, the conductive strip 28 should have a thickness of at least five skin depths at the operating frequency of the transmission line. As such, the conductive strip 28 is opaque to visible light.

However, since the thickness of the conductive film 38 is very small, i.e. less than one skin depth at the operating frequency of the transmission line 20, the conductive film 38 is transparent or, at least, substantially transparent, to visible light. Thus, as shown in FIG. 2, the entire transmission line 20 is substantially transparent except for the opaque conductive strip 28. However, since the width of the conductive strip 28 is so small, typically a millimeter or less, the visible interference of the conductive strip 28 for the overall transmission line 20 is minimal if noticeable at all.

With reference now to FIG. 3, a modified transmission line 20' is shown which, as before, includes a dielectric substrate 22 as well as a highly conductive strip 28 to convey the microwave signal. Both the strip 28 as well as the dielectric constant 22 have already been described in detail with respect to FIG. 1 and those descriptions apply equally to FIG. 3 and are incorporated by reference.

The transmission line 20' in FIG. 3 differs from the transmission line 20 in FIG. 1 in that the conductive film 38 is deposited on the dielectric substrate 22 on the same side 24 of the substrate 22 as the conductive film 28. The conductive film 38, however, is spaced from the conductive strip 28 so that an air gap 40 is formed along at least one, and preferably both sides of the conductive strip 28 and the conductive foil 38. The same type of materials used for the foil 38 in FIG. 3 are the same as the conductive foil 38 in FIG. 1 so that a further description thereof is unnecessary.

Since the conductive film 38 which forms the ground plane for the transmission line is less than one skin depth in thickness at the operating frequency of the transmission line, the transmission line of the present invention is necessarily less efficient than previously known transmission lines having ground planes which are several skin depths in thickness. However, for many applications, a decrease in efficiency and the resultant power loss are acceptable in view of the advantages obtained by a transparent, or substantially transparent, microwave transmission line. Such applications would include, for example, covert operations where hidden microwave antennas and other microwave circuitry are desired. Furthermore, the overall efficiency of the transmission line of the present invention may be enhanced by increasing the thickness of the ground plane conductive film from, for example, 0.2 skin depths to just under one skin depth at the operating frequency of the transmission line. Such increase in the thickness of the conductive film, however, in turn reduces the transparency of the transmission line 20 but the transmission line remains substantially transparent, i.e. the visual image through the transmission line is dimmed, but objects are still clearly identifiable. Consequently, engineering optically transparent transmission lines involves compromise where enhancements in transparency are offset by increased power loss and vice versa. Material processing methods such as doping, diffusion, and annealing could be used as a means of controlling this trade-off. For materials that exhibit the property of photoconductivity, illumination with an external source of light could be used as a means of controlling this trade-off. For materials whose conductivity is sensitive to environmental conditions, control of the ambient temperature and humidity could be used as a means of controlling this trade-off. For materials whose conductivity is sensitive to static electromagnetic fields, control of an externally applied electric field or magnetic field could be used as a means of controlling this trade-off.

With reference now to FIG. 4, one other aspect of utilizing a ground plane having less than one skin depth in thickness, of a highly conductive material, is that the overall impedance of the transmission line increases as compared to the traditional transmission lines using both a thick ground plane and thick conductive strip and exhibits approximately a 50 ohm impedance. For example, graph 52 corresponds to a microstrip transmission line whose ground plane is sub-skin-depth but optically opaque (due to the fact that an excellent conducting material is used . . . such as silver, copper or gold). Graph 52 represents the opaque limit and illustrates the variation of the absolute impedance Z as a function of w/h, i.e. the width (w) of the conductive strip 28/height (h) or thickness of the substrate 22. Thus, as shown by graph 52, by properly manipulating the width of the conductive strip 28, a standard impedance of about 50 ohms may be obtained that is a typical or target impedance of a microwave transmission line.

Graph 50 corresponds to a microstrip transmission line whose ground plane is sub-skin-depth and optically transparent (due to the fact that a material that is less conductive such as carbon nanotube mesh is used). Graph 50 represents the transparent limit and illustrates the same property, i.e. absolute impedance Z as a function of w/h for a transmission line utilizing a thick film conductive strip 28 but a thin film ground plane 38. As illustrated by graph 50, the impedance for a transmission line in accordance with the present invention is an order of magnitude or more than the previously known transmission lines.

Even though the transmission line of the present invention exhibits a higher impedance than the typical values of previously known transmission lines, the transmission line of the present invention may be still connected to a microwave circuit having a typically used value of transmission line characteristic impedance, such as 50 ohm, by simply utilizing an impedance matching network between the transmission line of the present invention and the remainder of the microwave circuit. The design of such impedance matching networks is well known and effectively minimizes the signal reflection between the transmission line of the present invention and other microwave circuitry having a different characteristic transmission line impedance.

From the foregoing, it can be seen that the present invention provides a transmission line that is transparent, or substantially transparent, to visible light. As such, it may be utilized in clandestine applications where inconspicuous electronics are required. For example, the transmission lines of the present invention may be utilized for microwave communications in windshields, goggles, and so forth.

Having described our invention, many modifications thereto will become apparent to those skilled in the art to which it pertains without deviation from the spirit of the invention as defined by the scope of the appended claims.

I claim:

1. A high radio frequency transmission line comprising a transparent structure that comprises:
   a dielectric substrate having two sides and constructed of a transparent material;
   an electrically conductive strip comprising a highly conductive, optically opaque metallic film having a width of less than a millimeter and a thickness of at least five skin depths of the operating frequency of the transmission line extending along at least a portion of one side of said substrate; and
   an electrically conductive film having a thickness of less than one skin depth of an operating frequency of the transmission line deposited on one of said sides of said substrate at a position spaced from said conductive strip, said film having a thickness sufficiently small so that said film is substantially transparent;
   wherein said transparent structure provides low power insertion loss of a radio frequency, microwave or millimeter wave signal at frequencies ranging from 5 GHz to 43 GHz;
   further wherein said transparent structure provides a minimally obstructed view of a distant object.

2. The transmission line as defined in claim 1 wherein the thickness of said film is less than a skin depth of an operating frequency of the transmission line.

3. The transmission line as defined in claim 2 wherein said thickness of said film is substantially one fifth of the skin depth at said operating frequency of said transmission line.

4. The transmission line as defined in claim 1 wherein said substrate is constructed of sapphire.

5. The transmission line as defined in claim 1 wherein said substrate is constructed of quartz.

6. The transmission line as defined in claim 1 wherein said substrate is constructed of amorphous silicon dioxide.

7. The transmission line as defined in claim 1 wherein said substrate is constructed of a transparent polymer.

8. The transmission line as defined in claim 1 wherein said conductive strip comprises a metal selected from the group consisting of silver, copper, gold and alloys thereof.

9. The transmission line as defined in claim 8 wherein said metal comprises gold.

10. The transmission line as defined in claim 8 wherein said metal comprises silver.

11. The transmission line as defined in claim 8 wherein said metal comprises copper.

12. The transmission line as defined in claim 1 wherein said conductive strip and said film are disposed on opposite sides of said substrate.

13. The transmission line as defined in claim 1 wherein said conductive strip and said film are disposed on the same side of said substrate.

14. The transmission line as defined in claim 1 wherein said film comprises a carbon nano-structured material.

15. The transmission line as defined in claim 14 wherein said carbon nano-structured material comprises carbon nanotubes.

16. The transmission line as defined in claim 1 wherein said film comprises a transparent conducting oxide.

17. The transmission line as defined in claim 1 wherein said film comprises a transparent conducting polymer.

18. The transmission line as defined in claim 1 wherein said film comprises a grid of conducting nano-wires.

19. The transmission line as defined in claim 1 wherein said film comprises an ultra-thin metallic film having a thickness of not greater than 10 nanometers.

20. The transmission line as defined in claim 1 wherein said film comprises an encapsulated transparent conducting fluid.

21. A high radio frequency transmission line comprising a transparent structure that comprises:
   a dielectric substrate having two sides and constructed of an optically transparent material;
   an electrically conductive strip comprising a highly conductive, optically opaque metallic film having a width of less than a millimeter and a thickness of at least five skin depths of the operating frequency of the transmission line extending along at least a portion of one side of said substrate; and
   an electrically conductive film having a sub-skin depth thickness of the operating frequency of the transmission line wherein said electrically conductive film comprises a substantially transparent carbon nanotube network that is deposited on one of said sides of said substrate at a position spaced from said conductive strip, said film having a thickness sufficiently small so that said film is substantially transparent;
   wherein said high radio frequency transmission line provides low power insertion loss of a radio frequency, microwave or millimeter wave signal at frequencies ranging from 5 GHz to 43 GHz;
   further wherein said transparent structure provides a minimally obstructed view of a distant object.

22. The transmission line as defined in claim 21 wherein the thickness of said electrically conductive film is less than one skin depth of an operating frequency of the transmission line.

23. The transmission line as defined in claim 21 wherein said thickness of said film is substantially one fifth of the skin depth at said operating frequency of said transmission line.

24. The transmission line as defined in claim 21 wherein said conductive strip comprises a metal selected from the group consisting of silver, copper, gold and alloys thereof.

25. The transmission line as defined in claim 21 wherein said substrate is constructed of an optically transparent material selected from the group consisting of sapphire, quartz, amorphous silicon dioxide, glass, and transparent plastics.

* * * * *